Oct. 27, 1964    A. A. GRIFFITH    3,153,907
POWER PLANT FOR DRIVING FLUID IMPELLER MEANS
Filed Sept. 8, 1961
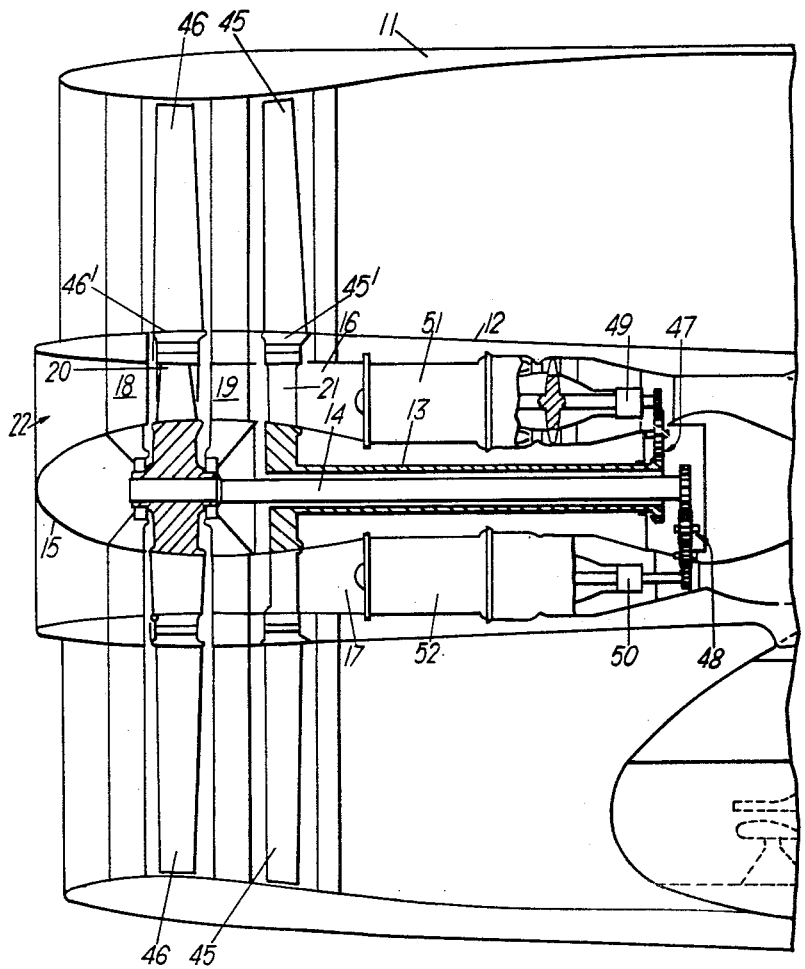
*Inventor*
ALAN A. GRIFFITH
By Cushman, Darby & Cushman
*Attorneys*

United States Patent Office 3,153,907
Patented Oct. 27, 1964

3,153,907
POWER PLANT FOR DRIVING FLUID
IMPELLER MEANS
Alan A. Griffith, Farnborough, England, assignor to Rolls-Royce Limited, Derby, England, a British company
Filed Sept. 8, 1961, Ser. No. 136,835
Claims priority, application Great Britain Oct. 15, 1960, 35,423/60; Sept. 13, 1961, 31,591/60
11 Claims. (Cl. 60—39.15)

This invention relates to a power plant for driving fluid impeller means such as a propeller, fan or compressor unit. Such power plants can be used, for example to drive propellers of turbo-prop aircraft, or to provide a supply of compressed air for use for example in wind tunnels, or to provide air for gaseous jets which are discharged vertically from vertical take-off aircraft.

According to the present invention there is provided a power plant having fluid impeller means and at least two engines for driving the impeller means, a one-way clutch being interposed in the drive from each engine so that on the failure of one engine, drive is still transmitted to the impeller means by the operative engine(s), the one-way clutch associated with the failed engine disengaging the latter from the impeller means so that rotation of the impeller means is unimpeded by the failed engine.

Preferably said impeller means comprises at least two independently rotatable coaxial fluid impellers, each of said impeller means being connected to at least a respective one of said engines. Said at least two fluid impellers may for example be mounted adjacent one another on respective coaxial shafts one of which extends within the other, drive being transmitted to said fluid impellers from said engines via said shafts. If desired, said at least two fluid impellers are contra-rotating.

Any suitable one-way clutch may be used, for example a one-way free wheel clutch.

The engines may be gas turbine engines, in which case preferably the impeller means has a central hub defining an air intake for said engines. The impeller means may be a ducted fan unit or a compressor unit e.g. having two or more independent motors each carrying a row of fan or compressor blades, and one or more rows of stator blades.

In the accompanying drawing is shown diagrammatically a power unit embodying the invention.

The power unit which can be used for powering the aircraft described in my United States patent application Serial No. 136,836, filed September 8, 1961, now United States Patent No. 3,073,549, issued January 15, 1963, comprises an outer casing 11 within which is supported an engine pod 12. In the pod 12 are two gas turbine engines 51 and 52. Engine 51 drives a hollow shaft 13 through clutch 49 and reduction gear 47, and the shaft 13 transmits the drive to a row of fan blades 45. Engine 52 drives a shaft 14 arranged concentrically within the shaft 13 through clutch 50 and reduction gear 48, and the shaft 14 transmits the drive to a row of fan blades 46. It will be seen that the reduction gear 48 includes four gear wheels whereas the reduction gear 47 only includes three gear wheels. As a result, the fan blade rows 45 and 46 are contra-rotating.

Although only two gas turbine engines 51, 52 are shown, the number of engines can be increased, for example to six, the engines being uniformly angularly spaced round the axis of the power unit, three of the engines each being coupled to the shaft 13 via a respective clutch and reduction gear as shown for engine 51, and the other three engines each being coupled to the shaft 14 via a respective clutch and reduction gear as shown for engine 52.

The air inlet to the gas turbine engines 51 and 52 is via an air entry 22 formed between the hub 15 of the fan and the engine pod 12, the air flowing past fixed vanes 18, 19, and rotary vanes 20, 21 which support the rings 46', 45' on which the rows of fan blades 46, 45 are respectively mounted, and finally via channels 16 and 17 to the engines 51, 52.

With the arrangement shown, if one engine fails, the other engine can still drive its associated fan blade row.

The clutches 49 and 50 are one-way clutches e.g. one-way free-wheel clutches such as conventional sprag type clutches, so that if an engine fails, the associated fan blade row can still rotate, e.g. windmill, without driving the failed engine. This feature is important in the particular aircraft described in the above-mentioned patent application Serial No. 136,836, now United States Patent No. 3,073,549, since it enables the aircraft to make a forced landing using ram air passing between the casing 11 and the engine pod 12 and through the rows of fan blades 46, 45, to provide some vertical lift for the aircraft.

It will be appreciated that this invention can be applied to contra-rotating propellers of the type normally used to power a turbo-prop aircraft.

I claim:

1. A power plant having fluid impeller means, at least two combustion engines drivingly connected to said impeller means, said impeller means having a central hub, an air intake passageway formed in said hub for conducting combustion air to said engines, and a one-way clutch interposed in the drive from each engine, whereby on the failure of one engine, drive is still transmitted to the impeller means by the operative engine, the one-way clutch associated with the failed engine disengaging the latter from the impeller means so that rotation of the impeller means is unimpeded by the failed engine.

2. A power plant as claimed in claim 1 in which said one-way clutch is a one-way free wheel clutch.

3. A power plant as claimed in claim 1 in which said fluid impeller means is a ducted fan unit.

4. A power plant as claimed in claim 1 in which said engines are gas turbine engines.

5. A power plant having at least two independently rotatable coaxially fluid impellers, at least two combustion engines each drivingly connected to a respective one of said fluid impellers, a central hub for each of said impellers, an air intake passageway formed in each hub, the air intake passageway of one hub communicating with the air intake passage of the other hub and both air intake passageways serving to conduct combustion air to said engines, and at least two one-way clutches, each clutch being interposed in the drive between an associated one of said engines and the respective fluid impeller, whereby on the failure of one engine, drive is still transmitted to one of the fluid impellers by the associated operative engine, the one-way clutch associated with the failed engine disengaging the latter from the associated fluid impeller so that rotation thereof is unimpeded by the failed engine.

6. A power plant as claimed in claim 5 in which said at least two fluid impellers are contra-rotating.

7. A power plant having at least two combustion engines, two coaxial shafts one of which extends within the other, at least two fluid impellers each mounted on a respective one of said coaxial shafts so that the fluid impellers are adjacent to one another an are rotatable independently of one another, a central hub for each of said impellers, an air intake passageway formed in each of said hubs, the air intake passageway of one hub communicating with the air intake passageway of the other hub and both air intake passageways serving to conduct combustion air to said engines, each of said engines being drivingly connected to a respective one of said shafts, at least two one-way clutches, each clutch being interposed in the drive between an associated one of said engines and the respective shaft, whereby on the failure of one engine, drive is still transmitted to one of the fluid impellers by the associated operative engine, the one-way clutch associated with the failed engine disengaging the latter from the associated fluid impeller so that rotation thereof is unimpeded by the failed engine.

8. A power plant having an outer casing, an inner casing mounted in said outer casing and defining therebetween a main fluid duct, said inner casing having mounted therein, at least two engines, two coaxial shafts one of which extends within the other, each of said engines being drivingly connected to a respective one of said shafts, at least two one-way clutches, each clutch being interposed in the drive between an associated one of said engines and the operative shaft, at least two bladed fan rotors each mounted on a respective one of said shafts so that said fan rotors are adjacent one another, are rotatable independently of one another, and the blades thereof extend across said main fluid duct; whereby on the failure of one engine, drive is still transmitted to one of the fan rotors by the associated operative engine, the one-way clutch associated with the failed engine disengaging the latter from the associated fan rotor so that rotation thereof is unimpeded by the failed engine.

9. A power plant having an outer casing, an inner casing mounted in said outer casing and defining therebetween a main fluid duct, said inner casing having mounted therein, at least two engines, two coaxial shafts one of which extends within the other, each of said engines being drivingly connected to a respective one of said shafts so that said shafts are contra-rotating, at least two one-way clutches, each clutch being interposed in the drive between an associated one of said engines and the respective shaft, at least two bladed fan rotors each mounted on a respective one of said shafts so that said fan rotors are adjacent one another, are rotatable independently of one another and the blades thereof extend across said main fluid duct; whereby on the failure of one engine, drive is still transmitted to one of the fan rotors by the associated operative engine, the one-way clutch associated with the failed engine disengaging the latter from the associated fan rotor so that rotation thereof is unimpeded by the failed engine.

10. A power plant having an outer casing, an inner casing mounted in said outer casing and defining therebetween a main fluid duct, said inner casing having mounted therein, at least two gas turbine engines, two coaxial shafts one of which extends within the other, each of said engines being drivingly connected to a respective one of said shafts, at least two one-way clutches, each clutch being interposed in the drive between an associated one of said engines and the respective shaft, at least two bladed fan rotors each mounted on a respective one of said shafts so that said fan rotors are adjacent one another, are rotatable independently of one another, and the blades thereof extend across said main fluid duct, said inner casing defining internally thereof an air entry passageway for said engines, which passageway extends through said fan rotors; whereby on the failure of one engine, drive is still transmitted to one of the fan rotors by the associated operative engine, the one-way clutch associated with the failed engine disengaging the latter from the associated fan rotor so that rotation thereof is unimpeded by the failed engine.

11. In an aircraft, a power plant having an outer casing, an inner casing mounted in said outer casing and defining therebetween a main fluid duct which opens forwardly of the aircraft, said inner casing having mounted therein, at least two gas turbine engines, two coaxial shafts one of which extends within the other, each of said engines being drivingly connected to a respective one of said shafts, at least two one-way clutches, each clutch being interposed in the drive between an associated one of said engines and the respective shaft, at least two bladed fan rotors each mounted on a respective one of said shafts so that said fan rotors are adjacent one another, are rotatable independently of one another, and the blades thereof extend across said main fluid duct, said inner casing defining internally thereof an air entry passageway for said engines, which passageway opens forwardly of the aircraft and extends through said fan rotors; whereby on the failure of one engine, drive is still transmitted to one of the fan rotors by the associated operative engine, the one-way clutch associated with the failed engine disengaging the later from the associated fan rotor so that rotation thereof is unimpeded by the failed engine, forward movement of the aircraft resulting in ram air being directed into said main fluid duct and into said air entry passageway.

References Cited in the file of this patent

UNITED STATES PATENTS

| | | |
|---|---|---|
| 2,120,821 | Waseige | June 14, 1938 |
| 2,180,599 | Menasco | Nov. 21, 1939 |
| 2,601,194 | Whittle | July 17, 1952 |
| 2,613,749 | Price | Oct. 14, 1952 |
| 2,851,113 | Irwin | Sept. 9, 1953 |